US012312961B2

(12) United States Patent
Amorim

(10) Patent No.: US 12,312,961 B2
(45) Date of Patent: May 27, 2025

(54) GUIDE VANE ASSEMBLY FOR A TURBOMACHINE

(71) Applicant: SAFRAN AIRCRAFT ENGINES, Paris (FR)

(72) Inventor: Joao Antonio Amorim, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/681,355

(22) PCT Filed: Jul. 5, 2022

(86) PCT No.: PCT/FR2022/051335
§ 371 (c)(1),
(2) Date: Feb. 5, 2024

(87) PCT Pub. No.: WO2023/012414
PCT Pub. Date: Feb. 9, 2023

(65) Prior Publication Data
US 2024/0337197 A1 Oct. 10, 2024

(30) Foreign Application Priority Data
Aug. 5, 2021 (FR) ....................................... 2108500

(51) Int. Cl.
*F01D 11/00* (2006.01)
*F01D 9/04* (2006.01)
(Continued)

(52) U.S. Cl.
CPC .............. *F01D 11/08* (2013.01); *F01D 9/041* (2013.01); *F01D 11/001* (2013.01); *F01D 11/02* (2013.01); *F05D 2240/55* (2013.01)

(58) Field of Classification Search
CPC ....... F01D 11/001; F01D 11/02; F01D 11/025
See application file for complete search history.

(56) References Cited

U.S. PATENT DOCUMENTS 4,309,145 A * 1/1982 Viola .................... F01D 11/025 415/173.7
5,215,435 A * 6/1993 Webb ...................... F01D 11/02 415/174.4
(Continued)

FOREIGN PATENT DOCUMENTS

FR 3027341 A1 4/2016
FR 3027343 A1 4/2016

OTHER PUBLICATIONS

International Search Report (with English translation) mailed Oct. 21, 2022, issued in corresponding International Application No. PCT/FR2022/051335, filed Jul. 5, 2022; 4 pages.
(Continued)

*Primary Examiner* — Courtney D Heinle
*Assistant Examiner* — Danielle M. Christensen
(74) *Attorney, Agent, or Firm* — CHRISTENSEN O'CONNOR JOHNSON KINDNESS PLLC

(57) ABSTRACT

A guide vane assembly for a turbomachine extending about an axis and having at least one stator vane which extends from a platform, a first flange extending radially inwards from the platform, a sealing element being mounted on the first flange by way of a sliding means that allows the sealing element to move radially with respect to the first flange, the sliding means having at least one pin mounted on the sealing element and/or on the first flange and engaged in at least one oblong orifice extending radially and formed in the first flange and/or in the sealing element, wherein the pin and/or the orifice are covered, at least partially, by a cover plate situated axially opposite of at least a part of the pin.

6 Claims, 4 Drawing Sheets

(51) Int. Cl.
*F01D 11/02* (2006.01)
*F01D 11/08* (2006.01)

(56) References Cited

U.S. PATENT DOCUMENTS

| | | | | |
|---|---|---|---|---|
| 6,524,065 | B2 * | 2/2003 | Briesenick | F01D 11/02 415/174.4 |
| 10,280,776 | B2 * | 5/2019 | Quelven | F01D 5/087 |
| 10,428,689 | B2 * | 10/2019 | Schmidt | F01D 9/04 |
| 10,677,080 | B2 * | 6/2020 | Klingels | F02C 7/28 |
| 11,506,129 | B2 * | 11/2022 | LoRicco | F01D 11/005 |
| 2013/0183145 | A1 | 7/2013 | Caprario et al. | |
| 2014/0105725 | A1 | 4/2014 | Stiehler | |

OTHER PUBLICATIONS

Written Opinion (with English translation) mailed Oct. 21, 2022, issued in corresponding International Application No. PCT/FR2022/051335, filed Jul. 5, 2022; 7 pages.

* cited by examiner

GUIDE VANE ASSEMBLY FOR A TURBOMACHINE

CROSS-REFERENCE TO RELATED APPLICATIONS

This application is a National Stage of International Application No. PCT/FR2022/051335, filed Jul. 5, 2022, which claims priority to French Patent Application No. 2108500, filed Aug. 5, 2021, the entire disclosures of which are hereby incorporated by reference in their entirety for all purposes.

FIELD OF THE INVENTION

The invention relates to a guide vane assembly for a turbomachine, such as for example an aircraft turbojet or turboprop.

DESCRIPTION OF RELATED ART

FIG. 1 shows a turbomachine 1 with double flow and double body. The axis of the turbo engine is referenced X and corresponds to the axis of rotation of the turning parts.

The terms axial, radial and circumferential are defined relative to the axis of the turbomachine.

The turbomachine 1 comprises, from upstream to downstream in the direction of flow of the gases, a fan 2, a low-pressure compressor 3, a high-pressure compressor 4, a combustion chamber 5, a high-pressure turbine 6 and a low-pressure turbine 7.

The air coming from the fan 2 is divided into a primary flow 8 flowing in a primary annular stream 9 and a secondary flow 10 flowing in a secondary annular stream 11 surrounding the primary annular stream 10.

The low-pressure compressor 3, the high-pressure compressor 4, the combustion chamber 5, the high-pressure turbine 6 and the low-pressure turbine 7 are laid out in the primary stream 9.

The rotor of the high-pressure turbine 6 and the rotor of the high-pressure compressor 4 are secured to each other in rotation via a first shaft 12 so as to form a high-pressure body.

The rotor of the low-pressure turbine 7 and the rotor of the low-pressure compressor 3 are secured to each other in rotation via a second shaft 13 so as to form a low-pressure body, where the fan 2 may be connected to the rotor of the low-pressure compressor 3 directly or else via an epicycloidal gear train, for example.

As can be better seen in FIG. 2, the low-pressure turbine 7 in particular comprises various successive stages, where each stage comprises a mobile wheel 14 and a guide vane assembly 15 located downstream from the mobile wheel 14.

Each mobile wheel 14 comprises a disk 16 near which are mounted blades 17, the disks 16 of various stages being connected to each other by platforms 18 fixed to each other and to the low-pressure rotor shaft 13. A rotor sealing ring 19 bearing wipers 20 is further mounted axially between the disks 16 of two successive mobile wheels 14.

Each guide vane assembly 15 comprises an internal platform 21 and an external platform (not shown) connected by vanes 22. A first flange 23 extends radially inward from the internal platform 21 and engages with a stator sealing element 24. In particular the sealing element 24 comprises an abradable support 25 comprising an annular part 25*a* extending axially and a second flange 26 extending radially outward from said annular part 25*a*. The first flange 23 is mounted sliding in an annular radial groove 27 of the second flange 26. In particular the first flange 23 can slide radially relative to the second flange 26.

A pin 28 is secured with the first flange 23 and is slidingly guided in an oblong orifice 29 of the second flange 26 so as to allow the translational movement in the radial direction of the sealing element 24 relative to the first flange 23 while also blocking rotation, around the X axis of the turbine 7 and the turbomachine 1 of said sealing element 24 relative to the rest of the guide vane assembly 15.

The sealing element 24 further comprises a block 30 of abradable material covering the radially internal surface of the support 25; the wipers 20 engage with the abradable block 30 30 so as to form a dynamic seal which is well known as such.

In operation, it is appropriate to limit the flow rate of gas which does not pass by the vanes 22 of the guide vane assembly 15. In other words, it is appropriate in particular to limit the clearance between the wipers 20 and the abradable block 30, this clearance may be dependent on temperature differences between various areas of the low-pressure turbine 7.

The sliding of the sealing element 24 relative to the first flange 23 serves to allow free expansion and contraction of the sealing element 24 as a function of the nature of the materials used and the temperature thereof, relative to the internal platform 21 and the first flange 23 which may follow different expansion phenomena because of different materials or temperatures, or because they also undergo expansion or contraction of the casing of the low-pressure turbine 7.

Such a technical solution serves to better adjust the clearance between the wipers 20 and the sealing element 30 while also limiting the mechanical stresses within the distributor.

A low-pressure turbine of this type is known from the document FR 3,027,343 in the name of the Applicant.

In practice, there is an axial clearance between the first flange 23 and the groove 27 of the second flange 26 such that the leakage gas flow rate may pass axially from upstream to downstream of the guide vane assembly 25, through the oblong hole 29 and/or through the clearance between the first flange 23 and the groove 27 of the second flange 26.

Such a leakage flow rate penalizes the yield of the turbine 7.

BRIEF SUMMARY OF THE INVENTION

The invention aims to remedy this disadvantage, simply, reliably and at low cost.

For this purpose, the invention relates to a guide vane assembly for a turbomachine extending about an axis and comprising at least one stator vane which extends from a platform, a first flange extending radially inwards from the platform, a sealing element being mounted on the first flange by way of sliding means that allow the sealing element to move radially with respect to the first flange, the sliding means comprising at least one pin mounted on the sealing element and/or on the first flange and engaged in at least one oblong orifice extending radially and formed in the first flange and/or in the sealing element, characterized in that the pin and/or the orifice are covered, at least partially, by a cover plate situated axially opposite at least part of the pin.

The cover plate may thus play a sealing role and make it possible to avoid a parasitic gas flow through the oblong orifice(s), from upstream towards downstream. Such a feature thus serves to improve the performance of the turbomachine.

The cover plate may extend axially upstream and/or axially downstream from the pin.

The cover plate may extend radially opposite at least one part of the pin. The covering sheet may extend radially inward and/or radially outward from at least part of the pin.

The cover plate may extend upstream or downstream from the pin in order to be axially opposite said pin.

The sliding means are designed for allowing a radial movement of said sealing element relative to the first flange included between 0.5 and 10 mm.

The cover plate may be fixed to the sealing element or to the first flange.

The cover plate may be fixed by soldering, welding or riveting it for example on the sealing element or on the flange.

The cover plate may be fixed onto the sealing element, in particular onto a second radial flange of the sealing element.

The second flange may be in contact with the first flange.

The pin may be formed by a bolt comprising a screw and a nut, the screw comprising a screw head and a shaft extending in the corresponding orifice(s).

The cover plate may cover the nut so as to form a cage delimiting an internal volume between the cover plate, on the one hand, and the sealing element or the first flange on the other hand, the nut being housed and held inside said internal volume.

Such a characteristic blocks the withdrawal of the nut.

The internal volume of the cage may be sized so as to allow the axial movement of the screw and nut.

The cover plate may comprise an opening through which passes at least part of the pin.

The free end of the shaft of the screw may pass through the opening. The section of the opening of the cover plate may be greater than the section of the affected part of the pin. The section of the opening of the cover plate is at least equal to the section of the first orifice and/or the second orifice.

A first oblong orifice may be made in the first flange, a second oblong orifice may be made in the sealing element, said pin passing through each orifice.

The second oblong orifice may be formed on the second flange.

The platform may extend over an angular sector and comprise on a circumferential end side at least one housing for an inter-sector sealing sheet.

The inter-sector sealing sheet may be annular and be non-sectorized.

Each sealing sheet may be fixed to the internal platform, for example by welding, soldering or riveting.

Each sealing sheet may be fixed to the first flange, for example by welding, soldering or riveting.

Each sealing sheet may comprise a branch extending axially and extending radially inward from the internal platform, and a branch extending radially.

Said branch extending radially may be in contact with the first flange and/or with the sealing element, in particular with the second flange and the sealing element.

The guide vane assembly may comprise a first inter-sector sealing sheet and a second inter-sector sealing sheet located respectively upstream and downstream from the first flange.

At least one inter-sector sealing sheet may comprise an opening arranged opposite the pin and the corresponding orifice.

The screw of the pin may comprise a head bearing on the inter-sector sealing sheet.

The cover plate may be housed, at least in part, in an opening of the inter-sector sealing sheet.

Said opening may be a recess opening out near an internal radial end of the inter-sector sealing sheet.

The sealing element may be annular and comprise an abradable support and a block of abradable material located radially inward of the abradable support and fixed to said support.

The abradable support may comprise the second flange. The abradable support may comprise an annual part extending axially and an annular part extending radially, forming the second flange.

The sealing element may be sectorized or not. Sealing means may be provided between the sectors, when said ring is sectorized.

The invention also relates to a low-pressure turbine for a turbomachine characterized in that it comprises a guide vane assembly of the aforementioned type.

Of course, the invention is applicable to other parts of the turbomachine.

The invention also relates to a turbomachine comprising a low-pressure turbine of the aforementioned type or a guide vane assembly of the aforementioned type.

The turbomachine may be an aircraft turbojet or turboprop. The aircraft may be an airplane.

The invention may also relate to an aircraft comprising a turbomachine of the aforementioned type.

DETAILED DESCRIPTION OF THE INVENTION

Figure 3:
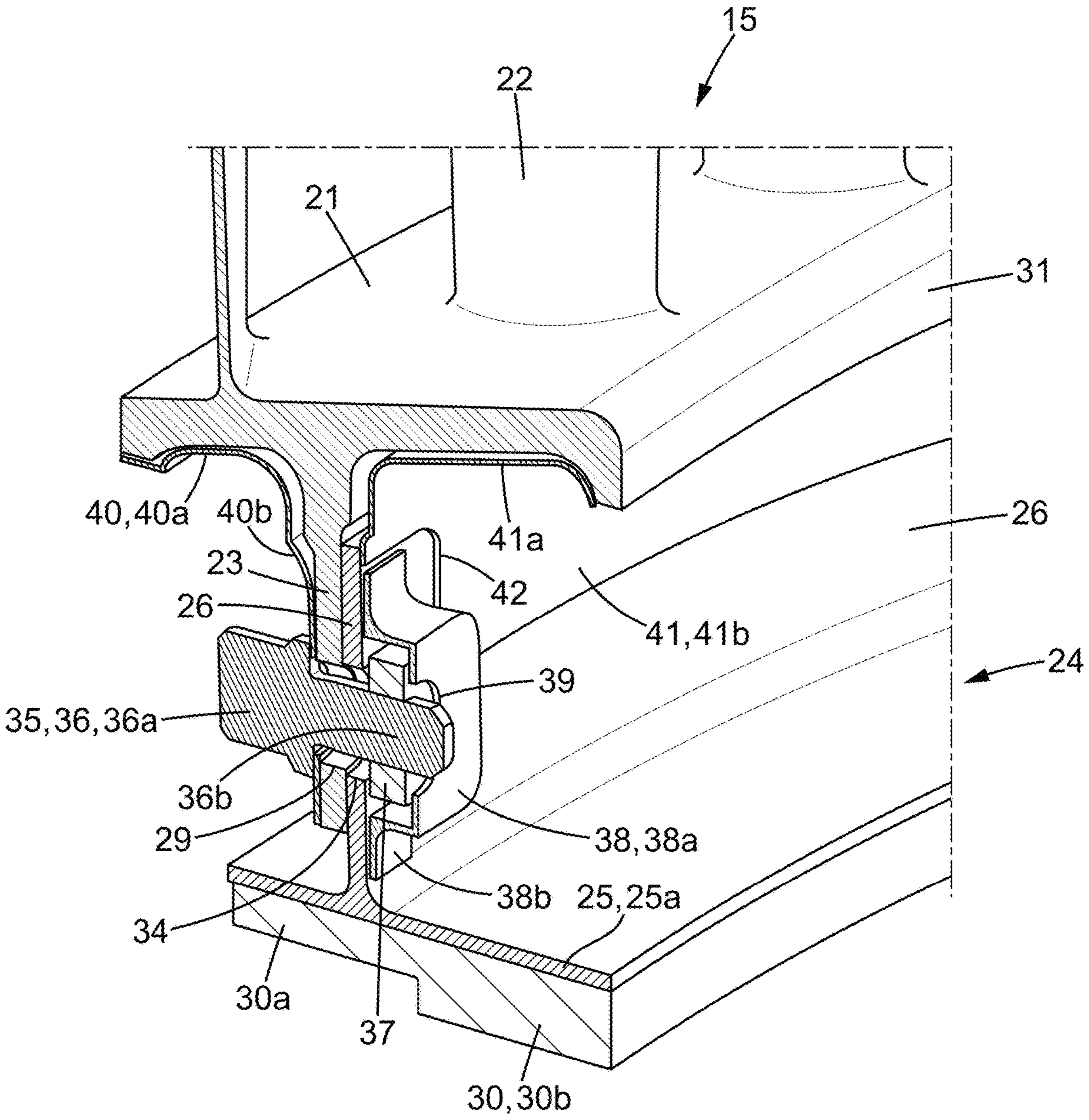
FIG. 3 is a perspective view of a part of a low-pressure turbine guide vane assembly according to an embodiment of the invention.
Figure 4:
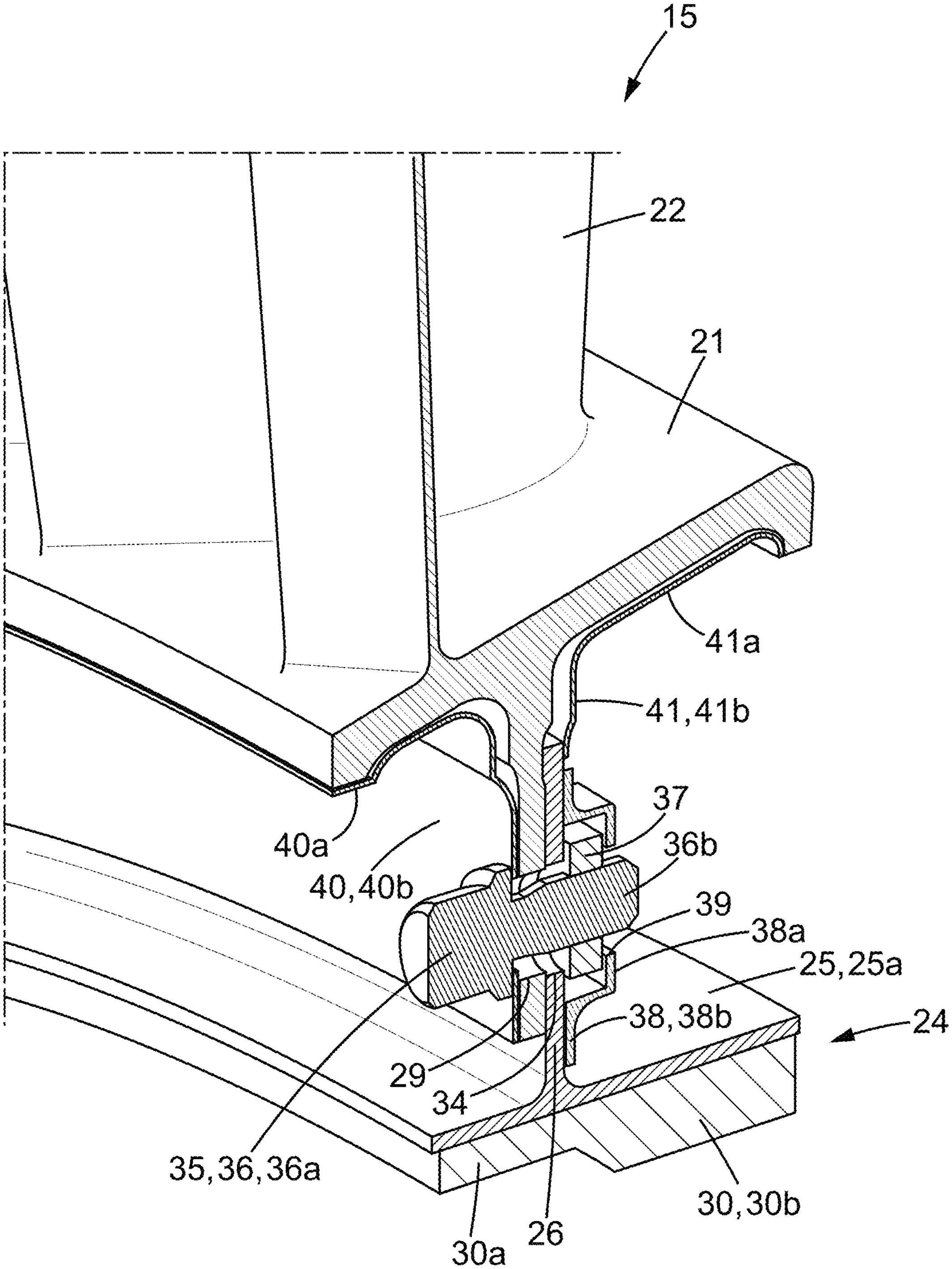
FIG. 4 is a perspective view of a part of the guide vane assembly from FIG. 3.
Figure 5:
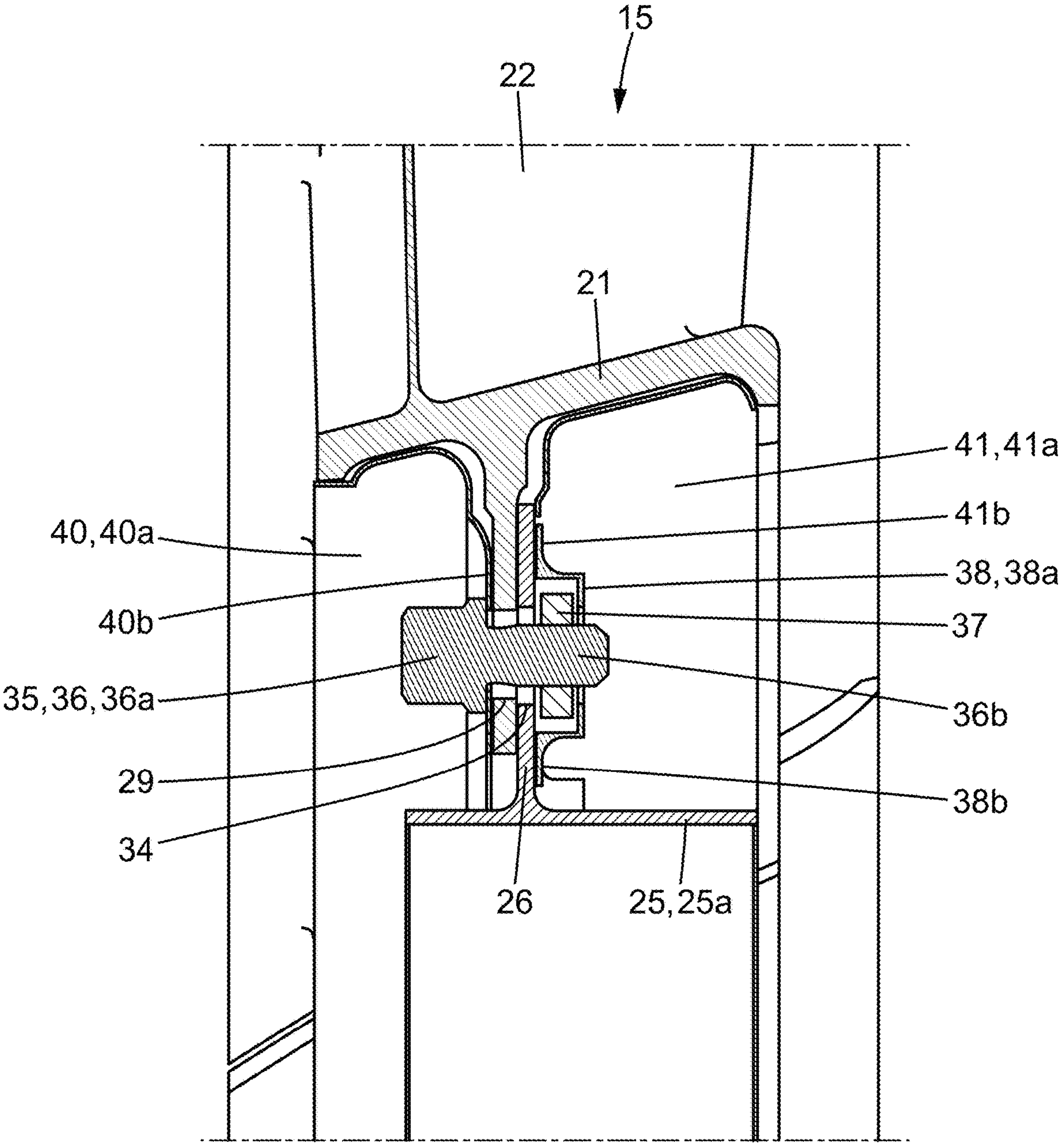
FIG. 5 is a radial section view of a part of the guide vane assembly from FIG. 3.

FIGS. 3 to 5 show a part of a guide vane assembly 15 intended to equip a low-pressure turbine 7 of a turbomachine 1 according to an embodiment of the invention.

The guide vane assembly 15 is intended to be mounted downstream from a mobile wheel 14 of the low-pressure turbine 7.

The guide vane assembly 15 extends about an axis which is coincident with the axis of the low-pressure turbine 7 and with the axis X of the turbomachine 1.

The terms axial, radial and circumferential are defined relative to the axis X of the guide vane assembly 15.

The guide vane assembly 15 comprises a radially internal platform 21 and a radially external platform (not shown) connected to each other by vanes 22 extending radially. The radially external platform may comprise hooks with which to attach the external platform onto a casing of the low-pressure turbine 7.

The internal 21 and external platforms are cylindrical or frustoconical.

Figure 1:
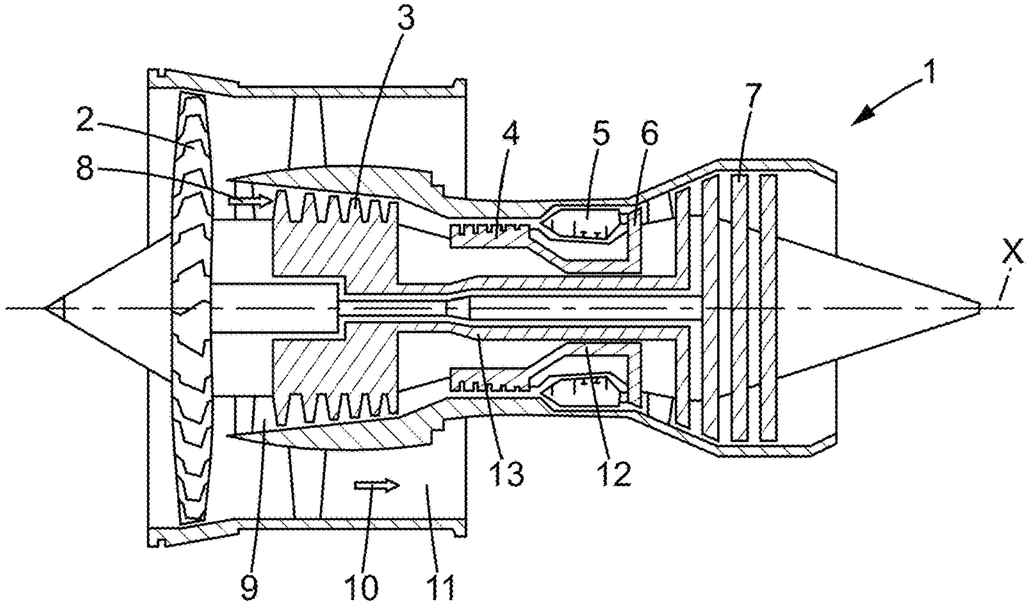
FIG. 1 (PRIOR ART)
FIG. 1 is a half-view in longitudinal section of a turbomachine from the prior art.
Figure 2:
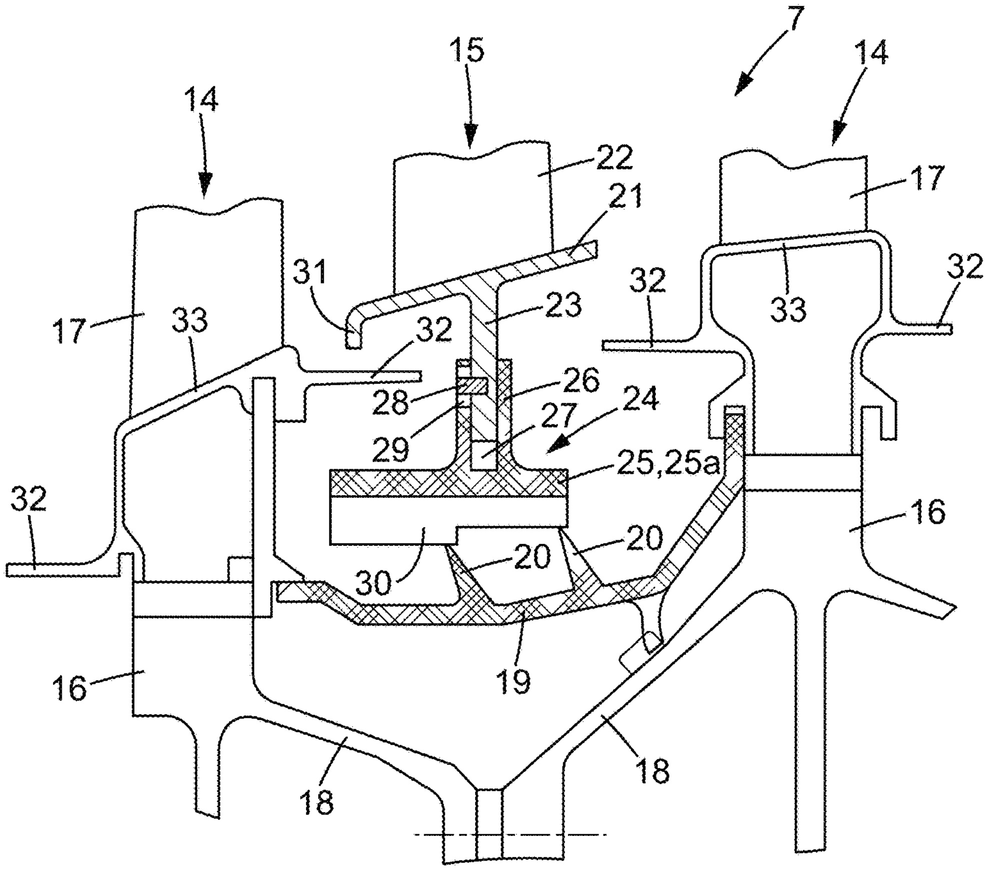
FIG. 2 (PRIOR ART)
FIG. 2 is a view in longitudinal section of a part of a low-pressure turbine from the prior art.

The radially internal platform 21 comprises at least one rim 31 at the upstream and/or downstream end thereof, where the rim 31 extends radially inward and serves to form a labyrinth seal with the spoilers 32 of the platforms 33 of the vanes of the mobile wheels 14 as is well known and can be seen in FIG. 2.

A first annular flange 23 extends radially inward from an axially medial zone of the internal platform 21. The first flange 23 comprises oblong orifices 29, uniformly distributed along the circumference.

The guide vane assembly 15 further comprises a sealing element 24 mounted on the first flange 23 and located radially inward from the internal platform 21.

The sealing element 24 comprises an abradable support 25 comprising a cylindrical or frustoconical part 25*a* and a second flange 26 extending radially outward from an axially medial zone of said cylindrical or frustoconical part 25*a*.

An annular abradable block 30 is fixed on the inner surface of the cylindrical or frustoconical part 25*a*. The abradable block 30 comprises an upstream part 30*a* whose radially inner surface is cylindrical and has a first diameter and a downstream part 30*b* whose radially inner surface is cylindrical and has a second diameter. The first diameter is greater than the second diameter. Each part 30*a*, 30*b* is intended to engage with at least one wiper 20 of the rotor of the turbine 7 so as to form a dynamic seal.

The second flange 26 comprises oblong orifices 34. The second flange 26 is parallel and able to come to bear flat axially on the first flange 23. The oblong orifices 34 of the second flange 26 are located opposite the oblong orifices 29 of the first flange 23.

A bolt 35 is associated with each pair of oblong orifices 29, 34 of the first flange 23 and the second flange 26. The bolt 35 comprises a screw 36 and a nut 37. The screw 36 comprises a head 36*a* and a shaft 36*b*. The shaft 36*b* passes through the oblong orifices 29, 34, when the nut 37 is screwed onto said shaft 36*b*. The head 36*a* of the screw 36 bears directly or indirectly against the upstream surface of the first flange 23. The nut 37 bears directly or indirectly against the downstream surface of the second flange 26. It is very clear that the opposite can be considered.

In operation, the second flange 26 may thus be moved radially relative to the first flange 23, upward or downward, until the shaft 36*b* of the screw 36 comes into contact with the corresponding radial ends of the oblong orifices 29, 34.

Such sliding means are designed for allowing a radial movement of the sealing element 24 relative to the first flange 23 included between 0.5 and 10 mm.

As a variant, only the first flange 23 or only the second flange 26 may comprise an oblong orifice 29, 34, where the other flange comprises an orifice with a diameter corresponding to the diameter of the shaft 36*b* of the screw 36.

The guide vane assembly 15 further comprises a cover plate 38 forming a cage in which the nut 37 is housed. The cover plate 38 comprises a central part 38*a* comprising an orifice 39, allowing the shaft 36*b* of the screw 36 to pass and also allowing movement thereof in the radial direction, and peripheral edges 38*b* fixed, for example by welding or soldering, to the second flange 26.

The cover plate 38 with the second flange 36 defines an internal volume or cage in which the nut 37 is housed, where the orifice 39 is sized for preventing a removal of the nut 37 outside said internal volume.

The cover plate 38 may thus play a sealing role and allow avoiding a parasitic flow of gas from upstream to downstream through the oblong orifice(s) 29, 34. Such a feature thus serves to improve the performance of the turbomachine 1.

The cover plate 38 is sized so as to allow translational movement of the screw 36 and nut 37.

The guide vane assembly 15 may be sectorized. In this case, the internal 21 and external platforms are sectorized, meaning formed of several angular sectors, where each sector of the internal platform 21 is connected to a corresponding sector of the external platform by at least two vanes 22.

The sealing element 24 may also be sectorized. In this case, each sector is mounted mobile in translation in the radial direction on the corresponding first flange 23.

In the case where the guide vane assembly 15 is sectorized, inter-sector sealing sheets 40, 41 may be arranged radially on the interior of the internal platform 21 and may extend circumferentially opposite the interface between at least two sectors of the internal platform 21.

Each inter-sector sealing sheet 40, 41 is for example annular and not sectorized.

Each sealing sheet 40, 41 may be fixed to the internal platform 21, for example by welding, soldering or riveting. Each sealing sheet 40, 41 may also be fixed to the first flange 23, for example by welding, soldering or riveting.

Each sealing sheet 40, 41 comprises a branch 40*a*, 41*a* extending axially and extending radially inward from the internal platform 21, and a branch 40*b*, 41*b* extending radially.

An upstream sealing sheet 40 thus comprises a branch 40*b* extending radially and in contact with the first flange 23. Said radial branch 40*b* comprises at least one opening arranged opposite each corresponding orifice 29 of the first flange 23 allowing the passage of the shaft 36*b* of the screw 36. The head 36*a* may come to bear on said radial branch 40*b* of the upstream sealing sheet 40, in particular in the area of the edge of said opening.

The upstream sealing sheet further comprises an axial branch 40*a* extending upstream from the radially external end of said radial branch 40*a*.

A downstream sealing sheet 41 comprises a branch 41*b* extending radially and in contact with the second flange 26. Said radial branch 41*b* comprises an opening, in particular a recess 42, in which the cover plate 38 is housed.

The downstream sealing sheet 41 further comprises an axial branch 41 extending downstream from the radially external end of said radial branch 41*a*.

The sealing sheets serve to limit the leakage flow rates at the interface between the sectors of the guide vane assembly.

The invention claimed is:

1. A turbomachine comprising a low-pressure turbine, the low-pressure turbine comprising a guide vane assembly, the guide vane assembly extending about an axis and comprising:

at least one stator vane which extends from a platform;

a first flange extending radially inward from the platform;

a sealing element being mounted on the first flange by way of a sliding means that allows the sealing element to move radially with respect to the first flange, the sliding means having at least one pin mounted on the sealing element and/or on the first flange and engaged in at least one oblong orifice extending radially and formed in the first flange and/or in the sealing element, wherein the pin and/or the orifice are covered, at least partially, by a cover plate situated axially opposite of at least a part of the pin, the pin being formed by a bolt comprising a screw and a nut, the screw comprising a screw head and a shaft extending in the corresponding orifice(s), the cover plate covering the nut so as to form a cage delimiting an internal volume between the cover plate, on the one hand, and the sealing element or the first flange on the other hand, the nut being housed and held inside the internal volume.

2. The turbomachine of claim 1, wherein the cover plate is fixed to the sealing element or to the first flange.

3. The turbomachine of claim 1, wherein the cover plate comprises an opening through which passes at least a portion of the pin.

4. The turbomachine of claim 1, wherein the at least one oblong orifice comprises a first oblong orifice and a second oblong orifice, and wherein the first oblong orifice is made in the first flange, the second oblong orifice is made in the sealing element, and the pin passes through each orifice.

5. The turbomachine of claim 1, wherein the platform extends over an angular sector and has, on a circumferential end side, at least one housing for an inter-sector sealing sheet.

6. The turbomachine of claim 1, wherein the sealing element is annular and comprises, on the one hand, an abradable support, and, on the other hand, a block of abradable material located radially inward of the abradable support, wherein the block of abradable material is fixed to the abradable support.

* * * * *